Patented May 18, 1943

UNITED STATES PATENT OFFICE 2,319,705

DRILLING MUD

Earl E. Post, Pomona, and Charles F. Bonnet, Monrovia, Calif., assignors to American Cyanamid Company, New York, N. Y., a corporation of Maine No Drawing. Application March 27, 1941, Serial No. 385,462

4 Claims. (Cl. 252—8.5)

This invention relates to an improvement in the art of drilling wells and is concerned particularly with improvements in the wall-building and water-loss characteristics of drilling fluids and with the application of such fluids to oil and gas wells.

In drilling oil and gas wells by the rotary drilling process it is common practice to circulate a mud-laden fluid downwardly through the drill stem of the drilling bit, across the face of the bit and upwardly through the drill hole. The circulating drilling mud serves to cool and lubricate the bit, mix with the cuttings and carry them to the surface, to seal off the sides of the well, to prevent loss of water from the drilling fluid into adjacent strata, to prevent blow-outs due to high pressure gas, and other purposes. The mud issuing from the well is passed through a settling tank or trough wherein the drill cuttings are separated and the mud is again pumped into the drill stem.

A satisfactory drilling mud must possess certain definite characteristics. It must have sufficient fluidity to permit pumping through the system and yet be of sufficient viscosity to carry the drill cuttings to the surface and prevent their settling around the bit and sticking it should circulation be stopped temporarily. Muds having thixotropic properties are employed to satisfy these requirements. These muds contain large amounts of colloidal material in the form of hydrated clay particles. Native clays are employed for making up drilling muds if possible but since they do not always contain the proper amount of colloidal material it is sometimes necessary to add Bentonite or a similar hydratable colloidal clay to build up the mud to the desired viscosity and thixotropic character. Soaps, boiled starch, gelatin and similar colloidal materials have also been employed for this purpose.

The drilling mud should also be of sufficient specific gravity to furnish a liquid column of high hydrostatic head in the well to prevent blow-outs of high pressure gas sometimes encountered in the drilling operation. The specific gravity of the mud may be increased and the danger of blow-outs correspondingly decreased by weighting the mud with insoluble materials of high density such as barytes, ferric oxide, litharge, zinc dust, metal filings, and similar materials.

One of the most important characteristics of drilling mud is its wall-building property. A good drilling mud must form on the walls of the well a thin, closely knit, impervious filter-cake wall which prevents loss of water from the drilling fluid to the adjacent strata. Loss of water from the drilling fluid through this mud wall may result in serious consequences. Absorption of water in oil sands forces away the oil and blocks it off, sometimes permanently, from flowing into the well when it is put into production. Water from the drilling fluid may also dissolve cementing materials and cause caving, or in shale formations it may cause hydration and swelling of the shale with resulting heaving. The mud wall also serves to seal off water sands and minor oil in gas sands.

Thickness of the mud wall alone is not a measure of its water impermeability, since a thick wall may be built up of flocculated particles and be of a more open structure allowing more water to pass through than a thin, closely knit wall formed from fine deflocculated particles. A thick wall should be avoided, however, since it decreases the diameter of the hole and may cause the bit to stick.

Another important function which the drilling fluid is sometimes called upon to perform is that of restoring circulation of the fluid. In fissured, gravelly and very loose and porous formations the drilling fluid may flow into the open structure and circulation is lost. In most cases circulation may be restored by adding to the drilling fluid fibrous materials such as cottonseed hulls, beet pulp and the like or by the addition of a material such as sodium alginate which may be converted into a stringy fibrous gel structure which fills the open pores and binds the loose formation in place.

We have found that drilling fluids may be greatly improved particularly in their wall-building and water-loss characteristics by the addition thereto of pectates. The pectates are added, ordinarily, in the form of a material known as crude pectate pulp, an article of commerce. The addition of as little as 0.5 pounds of crude pectate pulp per barrel of drilling mud will improve the wall-building properties of the mud by permitting the formation of a thinner, more flexible wall of firm texture and of a notable decreased water permeability thus allowing us to overcome many of the difficulties experienced with muds heretofore employed for the same purpose.

The use of larger quantities of pectate pulps allows us to further improve the wall-building and water-loss characteristics of drilling muds as will be evident from the results shown in the following specific examples. Comparatively large amounts of crude pectate pulp, as for example 5% by weight of the drilling fluid, will form a fluid with water of such character that it may be used as a drilling fluid without benefit of clay colloids should it be desired to do so. In even larger amounts, as for example up to 10% by weight of pectate pulp on the total weight of the drilling fluid, the fluid is particularly useful in restoring and preventing lost circulation. In all such cases pectate pulp may be used in conjunction with alginates or other wall-building materials which may be added to drilling fluids to modify the properties thereof.

The crude pectate pulp which we prefer to use is a material ordinarily obtained by processing plant tissue such as the pulp obtained from pressing fruits and vegetables. Closely associated with the cellulose of the cell wall of most fruits and vegetables such as apples, pears, lemons, oranges, rhubarb, carrots, beets, etc. are found certain pectic substances of which protopectin, often called pectose, is one. By careful treatment of such plant tissues with alkalies under controlled conditions of temperature and alkalinity followed by washing and drying of the pulp it is possible to convert the protopectin to pectates without separation from the fibrous pulp. This crude pectate pulp which contains up to about 35% of alkali pectate is the preferred material of our invention. It will be understood, however, that our invention also contemplates the use of the more or less pure pectates prepared from pectin or pectic acid by treatment with an alkali.

In some instances, as when the drilling mud is contaminated with salt or lime which may increase considerably the viscosity of the drilling mud, we may desire to add a pectate of low viscosity. Special pectate pulps which form solutions of low viscosity may be made by modified processes from the fruit pulp or by processing the crude pectate pulp in manner well known in the art to obtain depolymerized pectates. Low viscosity pectates may also be prepared by treatment of pectin or pectic acid with hot alkalies. Although the pectates are ordinarily added in the form of their water-dispersible alkali metal, ammonium or organic base salts their effectiveness in the drilling mud is probably due in part at least to the gel-forming properties of their insoluble alkaline earth or heavy metal salts. Accordingly, by the term "pectate" in the appended claims we intend to include the alkali metal, ammonium, organic base, alkaline earth and heavy metal salts of pectic acid as pure compounds or the crude pulp containing them in various stages of polymerization.

In order to determine quantitatively the superiority of our pectate containing drilling muds over conventional drilling muds a number of tests were made. A drilling mud prepared from clay from McKittrick, California, a clay widely used for oil and gas well drilling operations, was made up to a specific gravity of about 1.22 by the addition of water. The viscosity, wall-building properties and water-loss of this mud was determined by means of apparatus standard in the drilling art.

The viscosity of drilling mud is measured by the Marsh funnel viscosimeter and the results are expressed as the number of seconds required for 500 ccs. of the mud being tested to flow through a 3/16 inch orifice in the bottom of a cone-shaped funnel 6 inches in diameter at the top and 12 inches long. Results in seconds are indicated in the following examples as M. F. V. (500/500) seconds.

The water-loss characteristics of the mud are measured by a standard wall-building tester which consists essentially of a cylinder of 3 inches internal diameter, 5 inches in depth and having a perforated bottom plate supporting a screen over which a #50 Whatman filter paper is placed and a retaining washer. 500 ccs. of drilling mud is poured into the cylinder and a pressure of 100 lb. per sq. in. is applied to the mud over the filter paper. The water loss from the mud through the filter paper and filter cake deposited thereon is measured from time to time. Results are plotted on semilog graph paper, corrected by the usual method and extrapolated to obtain the 60 minute water loss. Upon completion of the test the thickness of the filter cake and its texture are then determined.

In most of the tests sodium chloride was added to the mud since this material is frequently encountered during the course of the drilling operation and tends to flocculate the clay colloids with undesirable effects upon the viscosity of the mud and its wall-building properties. In order to overcome the effects of salt and lime on the drilling mud a water-soluble salt of a polyphosphoric acid such as sodium tetraphosphate is sometimes added. The addition of salt and sodium tetraphosphate to the drilling muds being tested were made in order to provide a mud having characteristics as close as possible to muds actually encountered in drilling operations.

In order to simulate even closer the actual conditions of the drilling operation Examples 2 and 3 were conducted at an elevated temperature and in Examples 4 and 5 a mud was used which had been heated for some time in iron cylinders before determining its wall-building and water-loss characteristics.

The following specific examples are given merely by way of illustration to show the improvement in drilling muds by the addition thereto of pectate pulp and are not to be considered as in limitation of our invention.

EXAMPLE 1

A drilling mud having a specific gravity of 1.22 was prepared by mixing McKittrick clay with water and allowing the clay to hydrate by standing for several weeks. To a sample of the mud was added 1 pound per barrel of sodium tetraphosphate (S. T. P.) and the mixture agitated for 5 minutes. 1% of NaCl was then added and the mixing continued 5 minutes longer. Crude pectate pulp in amounts ranging from 0.5 to 20 pounds of crude pectate pulp per 42 gallon barrel of drilling fluid was added to 700 cc. portions of the mud and the mixture agitated 20 minutes longer making a total agitation period of 30 minutes. 500 ccs. of the mud was poured through a Marsh funnel viscosimeter to obtain its viscosity and then poured into a standard 3 inch wall-building testing unit and the water-loss characteristics of the mud determined. The results of these tests are given in the following table:

TABLE I

Crude pectate pulp

Room temperature; 1% NaCl; 1 lb./bbl. S. T. P.

| Lbs./bbl. pulp | M. F. V. (500/500)—seconds | | Water loss—cc. in 1 hour | |
|---|---|---|---|---|
| | Treated sample | Blank test | Treated sample | Blank test |
| 0.5 | 24.2 | 23.6 | 23.2 | 23.5 |
| 1.0 | 27.0 | 23.6 | 20.0 | 23.5 |
| 3.0 | 31.8 | 23.6 | 19.5 | 23.5 |
| 10.0 | 41.4 | 23.6 | 17.4 | 23.5 |
| 20.0 | 80.0 | 23.6 | 14.0 | 23.5 |

EXAMPLE 2

In order to determine the effects of high temperatures such as are encountered in actual drilling operations a series of tests was made as follows: 700 ccs. of the same McKittrick mud as described above was agitated for 5 minutes with 2% of NaCl; 1 pound per barrel of sodium tetraphosphate was then added and the agitation continued for 5 more minutes, whereupon crude pectate pulp was added and the agitation continued for 20 minutes more. The temperature of the mud was brought to 66° C. and the viscosity and water-loss characteristics determined with the following results:

TABLE II

*Crude pectate pulp*

66° C.; 2% NaCl; 1 lb./bbl. S. T. P.

| Lbs./bbl. pulp | M. F. V. (500/500)— seconds | | Water loss—cc. in 1 hour | |
|---|---|---|---|---|
| | Treated sample | Blank test | Treated sample | Blank test |
| 1.0 | 35.2 | 30.6 | 17.5 | 19.6 |
| 2.0 | 33.2 | 31.8 | 17.5 | 17.6 |
| 3.0 | 34.8 | 31.8 | 17.2 | 17.6 |
| 4.0 | 36.2 | 31.8 | 16.8 | 17.6 |
| 5.0 | 33.5 | 30.5 | 15.5 | 18.0 |

EXAMPLE 3

Another series of tests at high temperatures was made on drilling mud prepared exactly as described in Example 2 except that a special low viscosity pectate pulp was employed. The results are as follows:

TABLE III

*Special low-viscosity pectate pulp*

66° C.; 2% NaCl; 1 lb./bbl. S. T. P.

| Lbs./bbl. pulp | M. F. V. (500/500)— seconds | | Water loss—cc. in 1 hour | |
|---|---|---|---|---|
| | Treated sample | Blank test | Treated sample | Blank test |
| 1.0 | 36.2 | 31.8 | 15.7 | 17.6 |
| 2.0 | 39.8 | 31.8 | 14.7 | 17.6 |
| 3.0 | 43.4 | 31.8 | 13.5 | 17.6 |
| 5.0 | 54.0 | 31.8 | 11.5 | 17.6 |

The results of the tests made in Examples 2 and 3 show very clearly that high temperatures do not adversely affect the wall-building properties of pectate treated muds.

EXAMPLE 4

A drilling mud was prepared from McKittrick clay, 2% NaCl, 1 pound per barrel of S. T. P. and crude pectate pulp as described in Example 2 and the resulting drilling fluid heated to 100° C. in iron cylinders under reflux condensers for 16 hours. The viscosity of the material was taken at room temperature and the water-loss characteristics of the sample determined at a temperature of 66° C. The results of these tests are as follows:

TABLE IV

*Crude pectate pulp*

66° C.; 2% NaCl; 1 lb./bbl. S. T. P.

| Lbs./bbl. pulp | M. F. V. (500/500)— seconds | | Water loss—cc. in 1 hour | |
|---|---|---|---|---|
| | Treated sample | Blank test | Treated sample | Blank test |
| 1.0 | 55.0 | 45.0 | 22.1 | 25.5 |
| 3.0 | 66.5 | 44.0 | 20.8 | 25.7 |
| 5.0 | 81+ | 33.0 | 19.0 | 25.7 |

EXAMPLE 5

A drilling mud was prepared and treated exactly as in Example 4 except that a low viscosity pectate pulp was employed. The results are as follows:

TABLE V

*Special low-viscosity pectate pulp*

66° C.; 2% NaCl; 1 lb./bbl. S. T. P.

| Lbs./bbl. pulp | M. F. V. (500/500)— seconds | | Water loss—cc. in 1 hour | |
|---|---|---|---|---|
| | Treated sample | Blank test | Treated sample | Blank test |
| 1.0 | 44.6 | 38.4 | 24.0 | 26.5 |
| 3.0 | 72 | 38.4 | 21.0 | 26.5 |
| 5.0 | 85 | 38.4 | 20.0 | 26.5 |

The tests made in this example and in Example 4 show that pectate treated drilling muds are stable even under continued heating, a condition met with in actual drilling operations.

EXAMPLE 6

A drilling mud having a specific gravity of 1.28 was prepared from McKittrick clay. One sample of the mud was treated with crude pectate pulp containing 20% nigrosine and another sample was treated with quebracho extract, a material commonly used to improve wall-building and water-loss characteristics of drilling muds. The viscosity, water-loss and filter cake thickness of the samples were then determined with the following results:

TABLE VI

| | | | | |
|---|---|---|---|---|
| Lb./bbl. S. T. P | | 0.2 | 0.2 | 0.2 |
| Lb./bbl. pectate pulp (with 20% nigrosine) | | | | 0.4 |
| Lb./bbl. quebracho extract | | | 0.4 | |
| Viscosity (500/500)—seconds | 57.6 | 26.0 | 27.4 | 26.5 |
| Water loss—cc. in 1 hour | 14.8 | 14.2 | 13.3 | 12.3 |
| Cake thickness—inches | 3/32 | 2/32 | 1/32 | 1/32 |

Although this particular mud had very good original water-loss characteristics it will be seen that the addition of pectate pulp improves the character of the filter cake and reduces still further the water loss through the mud wall. It will also be observed that the pectate pulp does not interfere with the deflocculating action of S. T. P.

To show the superior effectiveness of pectate pulp in reducing water-loss in the presence of salt contamination, samples of the mud described above were heated to 150° C. with continuous agitation. During the heating the concentration of chemicals in the mud was increased gradually by the addition of sodium chloride, sodium tetraphosphate, quebracho extract and pectate pulp. The water-loss of the various mud samples were then determined with the following results:

TABLE VII

| | | | |
|---|---|---|---|
| Percent NaCl (on water content) | 5.0 | 5.0 | 5.0 |
| Lb/bbl. S. T. P | 1.2 | 1.2 | 1.2 |
| Lb./bbl. pectate pulp | | | 16.0 |
| Lb./bbl. quebracho extract | | 16.0 | |
| Water loss—cc. in 1 hour | 27.6 | 28.5 | 13.5 |

It will be noted that despite the considerable amount of salt contamination with resultant flocculation and increase in water-loss in the control sample the pectate pulp-treated mud sample showed a remarkable reduction in water-loss as compared with the untreated and quebracho-treated samples.

EXAMPLE 7

A lime cut drilling fluid was prepared from McKittrick mud by adding 500 ppm. of $Ca^{++}$, in the form of $Ca(OH)_2$. The mud at a specific gravity of 1.22 was agitated 30 minutes before determining its viscosity and wall-building properties. To other samples of the same lime-cut mud was added after 10 minutes of agitation crude pectate pulp and the agitation continued 20 minutes longer. The viscosity and wall-building properties of these muds are given in the following table:

TABLE VIII

Crude pectate pulp

| Room temperature; 500 ppm $Ca^{++}$ | | | |
|---|---|---|---|
| Lbs./bbl. pectate pulp | None | 2 | 5 |
| Marsh funnel viscosity—(500/500) seconds | 21.4 | 27.9 | 26.2 |
| Water loss—cc. in one hour | 22.1 | 21.5 | 17.3 |
| Filter cake thickness—inches | 3/32 | 3/32 | 3/32 |

EXAMPLE 8

To demonstrate the effectiveness of pectate pulp on uncontaminated drilling muds a series of tests was made on freshly prepared uncontaminated drilling mud containing varying amounts of crude pectate pulp. The results were as follows:

TABLE IX

Crude pectate pulp

| Room temperature; no contamination | | | |
|---|---|---|---|
| Lbs./bbl. pectate pulp | None | 2 | 5 |
| M. F. V. (500/500)—seconds | 21.5 | 22.9 | 25.2 |
| Water loss—cc. in one hour | 20.0 | 18.8 | 17.0 |
| Filter cake thickness—inches | 3/32 | 3/32 | 3/32 |

It will be understood of course that pectate pulps may be used with drilling muds containing a wide diversity of materials in accordance with our invention. Our invention contemplates the addition of pectates to muds containing various specific gravity-increasing agents such as barytes, ferric oxide, litharge, pyrites, etc. and added colloidal materials such as bentonite, boiled starch, soaps, gelatin, etc., which have been added to control the viscosity and thioxotropic properties of the mud. Pectates may also be used in drilling muds in combination with other wall-building and water-loss compositions such as sodium alginate, gum arabic, gum karaya, gum ghatti, and nigrosine. We do not claim the use of gum ghatti or nigrosine per se as wall-building materials since the addition of gum ghatti for this purpose is the subject matter of an application of R. B. Booth, Serial No. 382,172, filed March 7, 1941, and the use of nigrosine is being claimed as the subject matter of an application of R. B. Booth, Serial No. 385,470, filed March 27, 1941.

As the addition of pectates improves the wall-building and water-loss characteristics of salt- and lime-cut muds it may be used in such muds with materials which have been added to control mud viscosity such as sodium tetraphosphate, tetrasodium pyrophosphate, sodium acid pyrophosphate, sodium hexametaphosphate and other water-soluble polyphosphates, waste sulfite and soda liquors from pulping processes, alkali metal silicates, tannic acid extracts, urea, thiourea and urea derivatives and dicyandiamide and related compounds.

The amount of pectate pulp added to the drilling mud depends upon the concentration of pectates in the pectate pulp, the results desired and the characteristics of the particular mud being treated. With some muds and while drilling through impervious formations it will be found necessary to use but a small amount of pectate pulp. However, as the formation becomes more porous and as the character of the mud becomes changed through contamination and the use of various modifying agents it frequently becomes desirable to add more of the pectate. In practice, the addition of pectate pulp may be either continuous or intermittent and it is not feasible to define the proper concentration in terms of the quantities added which must necessarily be governed by empirical methods. Ordinarily the pectate pulp will be dispersed in water and added to the drilling fluid in the mud ditch in small quantities as the drilling operation proceeds. However, it is possible to add pectates or crude pectate pulp to the clay as it is being processed or they may be mixed with bentonite, barytes, or other materials which are intended to be added to the mud.

What we claim is:

1. A drilling fluid comprising a thixotropic clay dispersion and a pectate.

2. An aqueous mud dispersion having improved wall-building properties for oil and gas wells comprising clay and pectate pulp.

3. A drilling mud for use in lining oil and gas wells which comprises clay, bentonite and crude pectate pulp.

4. A drilling mud for use in lining oil and gas wells which comprises hydrated clay, a water-soluble polyphosphate and crude pectate pulp.

EARL E. POST.
CHARLES F. BONNET.